Nov. 4, 1952 — M. F. NACE — 2,616,287
COMBINED STIRRER AND HYDROMETER TESTER
Filed April 22, 1949
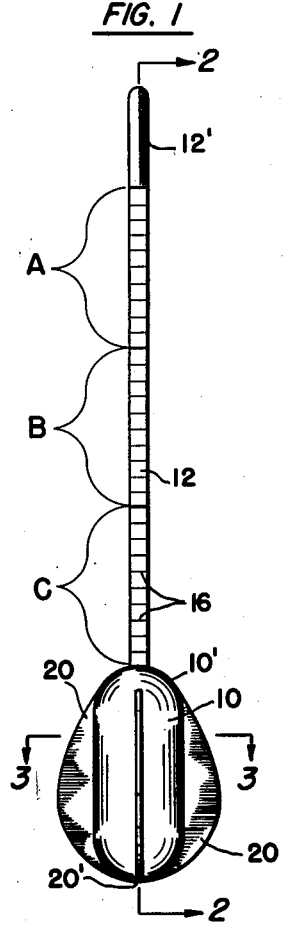
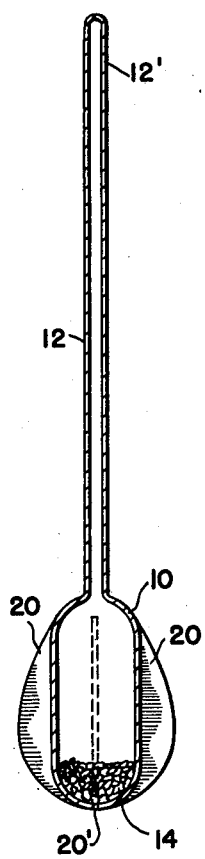
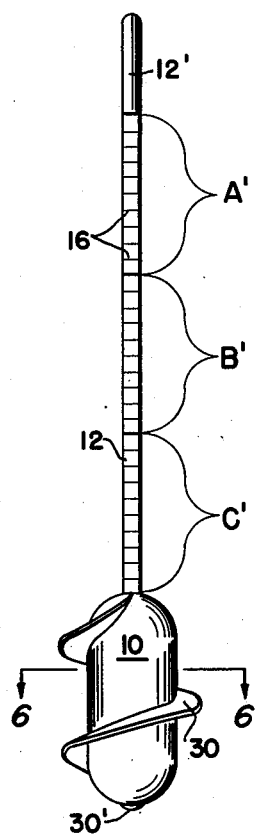
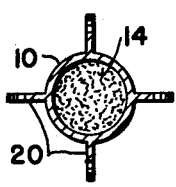
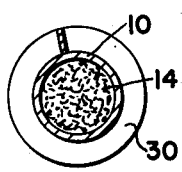
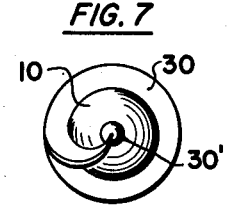
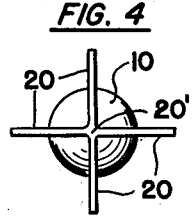
INVENTOR.
MELVIN F. NACE
BY J. Wesley Everett Patented Nov. 4, 1952

2,616,287

UNITED STATES PATENT OFFICE 2,616,287

COMBINED STIRRER AND HYDROMETER TESTER

Melvin F. Nace, Phoenix, Md.

Application April 22, 1949, Serial No. 89,117

1 Claim. (Cl. 73—33)

The present invention relates to a combination stirrer and measuring instrument and is particularly adapted for use in connection with mixed drinks for testing the alcoholic contents of the same. The testing of the liquid is done by determining its specific gravity and having a scale associated with the device which will give a reading within the range of the normal drink which may be, for example, from ninety proof to no alcoholic content at all. However, the range of the testing apparatus may be a matter of choice and may be made to cover whatever range is desired.

The principal object of the invention is to provide a device of novel construction whereby the specific gravity of a liquid may be ascertained and the liquid may be stirred by rotating the device.

Another object of the invention is to provide both the testing and stirring elements in a single piece.

While several objects have been briefly pointed out, other objects and advantages will be apparent as the nature of the invention is more fully disclosed consisting of its novel construction shown in the accompanying drawings and described in the detail description forming a part of the specification and in which:

Figure 1 is a view in elevation of the preferred form of the invention.

Figure 2 is a vertical sectional view of the same taken along the line 2—2 of Figure 1.

Figure 3 is a sectional view taken along the line 3—3 of Figure 1.

Figure 4 is an inverted plan view of the same.

Figure 5 is a view in elevation of a modified form of the invention.

Figure 6 is a sectional view taken along the line 6—6 of Figure 5.

Figure 7 is an inverted plan view of the modified form.

Like numerals and characters will be used to designate like and similar parts throughout the several views.

Referring to the preferred form shown in Figures 1 to 4, the device resembles generally a hydrometer having an enlarged portion 10 and a stem portion 12. A predetermined weight 14 is secured in the bottom of the portion 10, whereby the depth the device sinks into the liquid may be controlled. The amount of alcohol in the drink may be read directly upon the stem 12 by means of the graduations 16. The stem may further be divided into sections of different colors as shown at A, B, and C. However, any marking arrangement may be used which may conveniently give the alcoholic contents.

On the lower end of the device and arranged about the portion 10 are a plurality of fin members 20. These fins extend radially of the bulb portion 10, the upper portion conforming and coinciding with the upper curvature 10' of the bulb, the lower ends of the fin converging at 20' and slightly below the lower end of the bulb 10, which will support the device, or stirrer, from the bottom of the container and increasing the strength of the bulb 10 about the portion carrying the weighting member 14.

In use the stirrer is placed in a glass or other container and when released will seek a level depending upon the specific gravity of the liquid. This, as stated before, may be read directly from the scale 16. If it is desired to stir the liquid, the upper end 12' of the stem is rotated by the fingers, and as the fins 20 are immersed in the liquid, the liquid will be agitated by the rotating and spinning of the device.

In the modified form, the fins 20 are replaced by the spiral member 30. The spiral starts at the top of the bulb 10 and terminates slightly below the bottom of the bulb at 30' and forms a bearing, or an increased thickness, adjacent the bottom of the device which normally rests on the bottom of the glass, or container, for increasing the strength of the bulb. The spiral member 30 when rotated gives the liquid an upward, or downward, motion similar to the action of a propeller and acts to stir the liquid.

The combination stirrer and testing instrument is so designed that it may be cast in a single piece either of glass or of one of the well-known plastic materials, and in any desired color or combination of colors.

While the device has been illustrated and described in a specific form, it is not intended to be limited thereto as its shape, size and design may be altered or changed without departing from the spirit of the invention, and only so far as the invention has been particularly pointed out in the accompanying claim is the same to be limited.

I claim:

A unitary stirrer and tester for liquid drinks comprising a small elongated transparent hollow tubular body portion forming the upper end thereof and an enlarged cylindrical weighted portion forming the lower end, radial fins extending outwardly from the sides of the cylindrical portion throughout its length, the radial length of the fins at their widest point being substantially that of the radius of the cylindrical portion, the outer edges of the fins being formed along a continuous curve beginning at the top and bottom of the cylindrical portion.

MELVIN F. NACE.

REFERENCES CITED

The following references are of record in the file of this patent:

UNITED STATES PATENTS

| Number | Name | Date |
|---|---|---|
| 1,424,108 | Luthy | July 25, 1922 |
| 1,764,254 | Freas | June 17, 1930 |

FOREIGN PATENTS

| Number | Country | Date |
|---|---|---|
| 14,169 | Great Britain | Apr. 6, 1888 |
| 40,991 | Germany | Oct. 8, 1887 |